(12) United States Patent
Hand

(10) Patent No.: US 9,854,794 B1
(45) Date of Patent: Jan. 2, 2018

(54) FLY SWATTER HAVING A REMOVABLE ADHESIVE SLEEVE

(71) Applicant: Monique Hand, Chandler, AZ (US)

(72) Inventor: Monique Hand, Chandler, AZ (US)

( * ) Notice: Subject to any disclaimer, the term of this patent is extended or adjusted under 35 U.S.C. 154(b) by 197 days.

(21) Appl. No.: 14/943,437

(22) Filed: Nov. 17, 2015

(51) Int. Cl.
*A01M 3/02* (2006.01)

(52) U.S. Cl.
CPC .................... *A01M 3/022* (2013.01)

(58) Field of Classification Search
CPC combination set(s) only.
See application file for complete search history.

(56) References Cited

U.S. PATENT DOCUMENTS

| | | | |
|---|---|---|---|
| 1,083,179 A * | 12/1913 | Armstrong | A01M 3/022 43/136 |
| 2,618,882 A * | 11/1952 | Martin | A01M 3/022 43/136 |
| 3,449,856 A | 6/1969 | Weaver | |
| 4,793,094 A | 12/1988 | Weaver | |
| 5,058,314 A * | 10/1991 | Frascone | A01M 3/022 43/136 |
| 5,630,290 A * | 5/1997 | Wade | A01M 3/022 43/136 |
| 6,055,767 A | 5/2000 | Carter | |
| D426,280 S | 6/2000 | Nelson | |
| 6,185,862 B1 | 2/2001 | Nelson | |
| 6,957,510 B1 | 10/2005 | Kominkiewicz | |
| 7,430,830 B1 * | 10/2008 | Rosa | A01M 3/022 43/136 |
| 7,540,112 B1 | 6/2009 | Crenshaw | |
| 7,721,486 B2 | 5/2010 | Rosario | |
| 9,179,663 B1 * | 11/2015 | Holland | A01M 3/02 |

FOREIGN PATENT DOCUMENTS

CN 203072731 U 7/2013

* cited by examiner

*Primary Examiner* — Christopher P Ellis
(74) *Attorney, Agent, or Firm* — Kyle A. Fletcher, Esq.

(57) ABSTRACT

The fly swatter having a removable adhesive sleeve includes a wire frame that includes a swatter frame on a first distal end and a handle on a second distal end. The swatter frame is further defined with a pair of diagonal members that extend outwardly and connect to a lateral member. The lateral member connects between the pair of diagonal members and a pair of longitudinal members. The swatter frame is provided to enable a removable adhesive sleeve to slide onto the wire frame in order to form the swatter portion of the fly swatter.

11 Claims, 3 Drawing Sheets

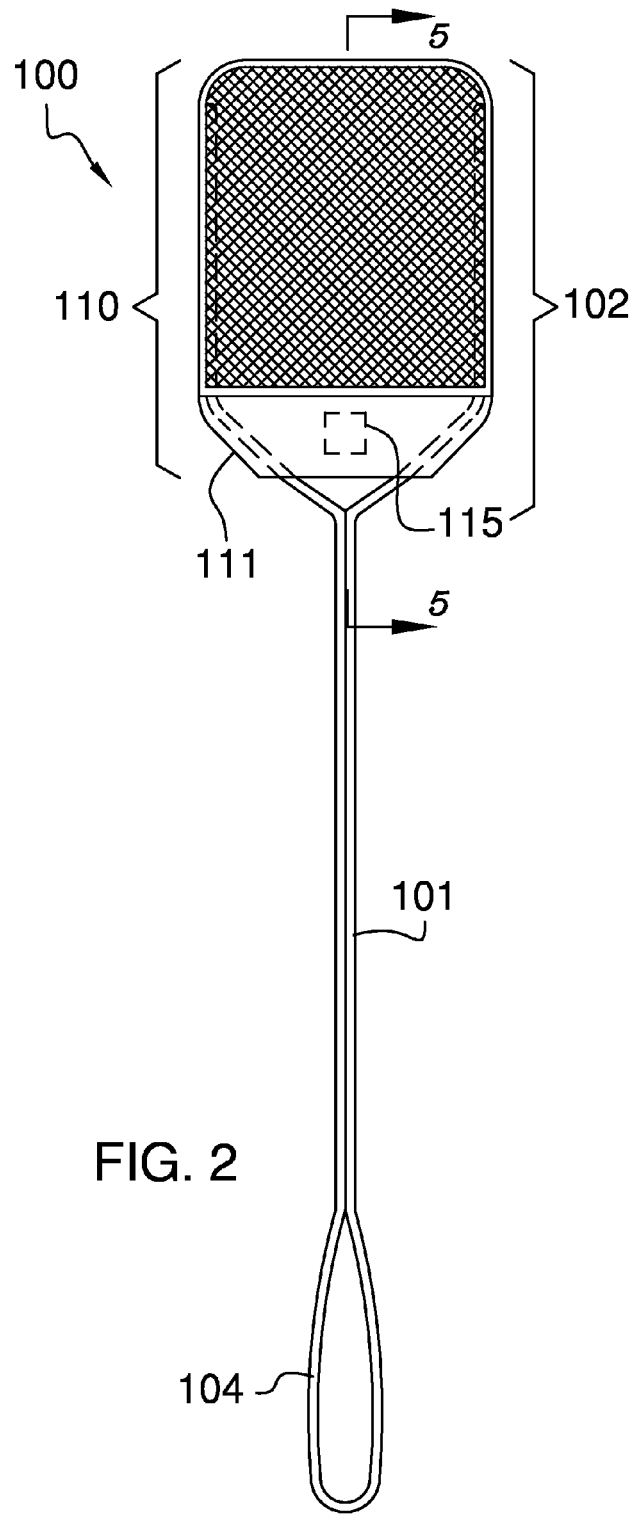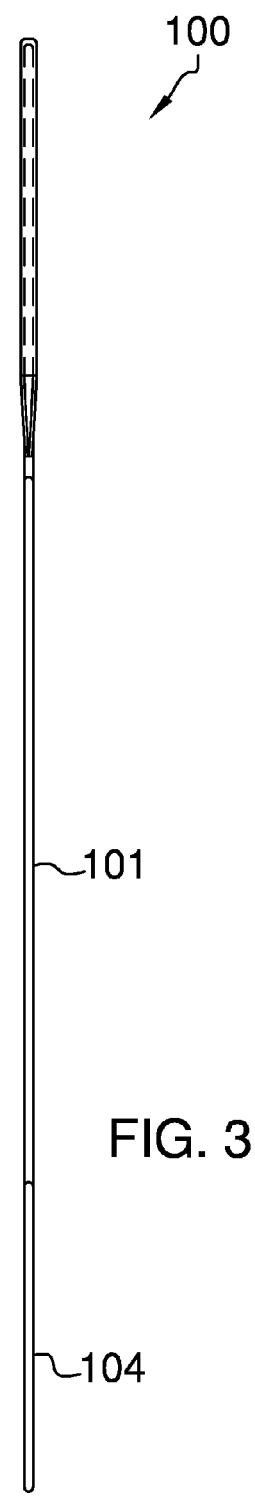
FIG. 2
FIG. 3

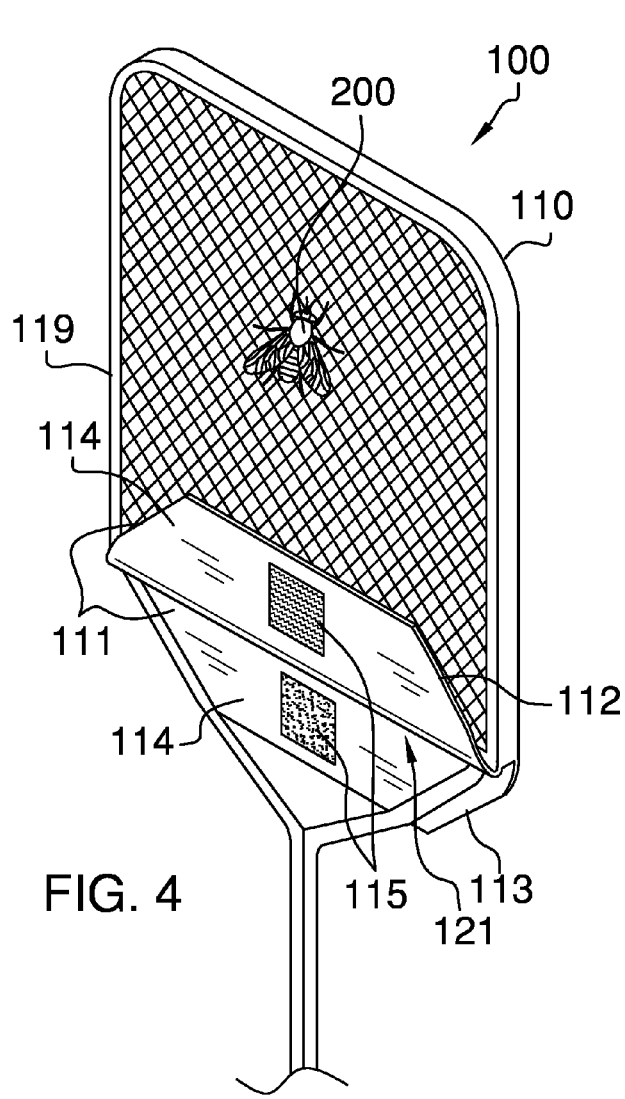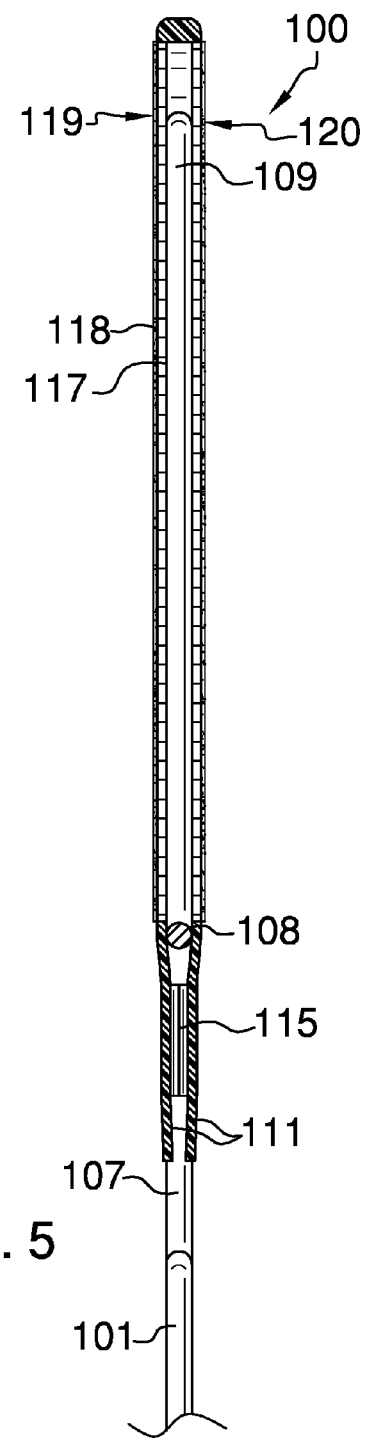

FLY SWATTER HAVING A REMOVABLE ADHESIVE SLEEVE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of fly swatters, more specifically, a fly swatter that includes a removable adhesive sleeve that is used to collect remnants of a swatted fly.

Fly swatters are an everyday necessity. This is especially true during the summer months. Fly swatters typically include an elongated wire frame that includes a handle on a first end and a swatter at the second end. The objective is to flick the wrist in order for the swatter to impact the nuisance fly. There are shortcomings with these fly swatters in that the swatter gets coated with fly remnants and guts. Also, the fly may fall to the ground after being swatted, and require manual retrieval.

What is needed in the prior art, and is accomplished via the device of the present application is a fly swatter that includes a removable adhesive sleeve that fits over the fly swatter in order to collect the swatted fly thereon. Moreover, the removable adhesive sleeve and adhered fly are collectively discarded at the discretion of the user.

SUMMARY OF INVENTION

The fly swatter having a removable adhesive sleeve includes a wire frame that includes a swatter frame on a first distal end and a handle on a second distal end. The swatter frame is further defined with a pair of diagonal members that extend outwardly and connect to a lateral member. The lateral member connects between the pair of diagonal members and a pair of longitudinal members. The swatter frame is provided to enable a removable adhesive sleeve to slide onto the wire frame in order to form the swatter portion of the fly swatter. The removable adhesive sleeve includes a pair of flap members that engage opposing sides of the pair of diagonal members. The pair of flap members each include a securing member that secures the removable adhesive sleeve onto the swatter frame at the pair of diagonal members. The removable adhesive sleeve includes an adhesive surface that is provided onto a mesh substrate. The mesh substrate and the adhesive surface are provided on a first side and a second side of the removable adhesive sleeve. The adhesive surface and the mesh substrate enable air movement to flow across the first side and the second side in order to enable swatting speeds to be reached when the device is in use.

These together with additional objects, features and advantages of the fly swatter having a removable adhesive sleeve will be readily apparent to those of ordinary skill in the art upon reading the following detailed description of the presently preferred, but nonetheless illustrative, embodiments when taken in conjunction with the accompanying drawings.

In this respect, before explaining the current embodiments of the fly swatter having a removable adhesive sleeve in detail, it is to be understood that the fly swatter having a removable adhesive sleeve is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the fly swatter having a removable adhesive sleeve.

It is therefore important that the claims be regarded as including such equivalent construction insofar as they do not depart from the spirit and scope of the fly swatter having a removable adhesive sleeve. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is a rear view of an embodiment of the disclosure.

FIG. 3 is a side view of an embodiment of the disclosure.

FIG. 4 is a detailed, perspective view of an embodiment of the disclosure.

FIG. 5 is a cross-sectional view of an embodiment of the disclosure along line 5-5 in FIG. 2.

DETAILED DESCRIPTION OF THE EMBODIMENT

Figure 1:
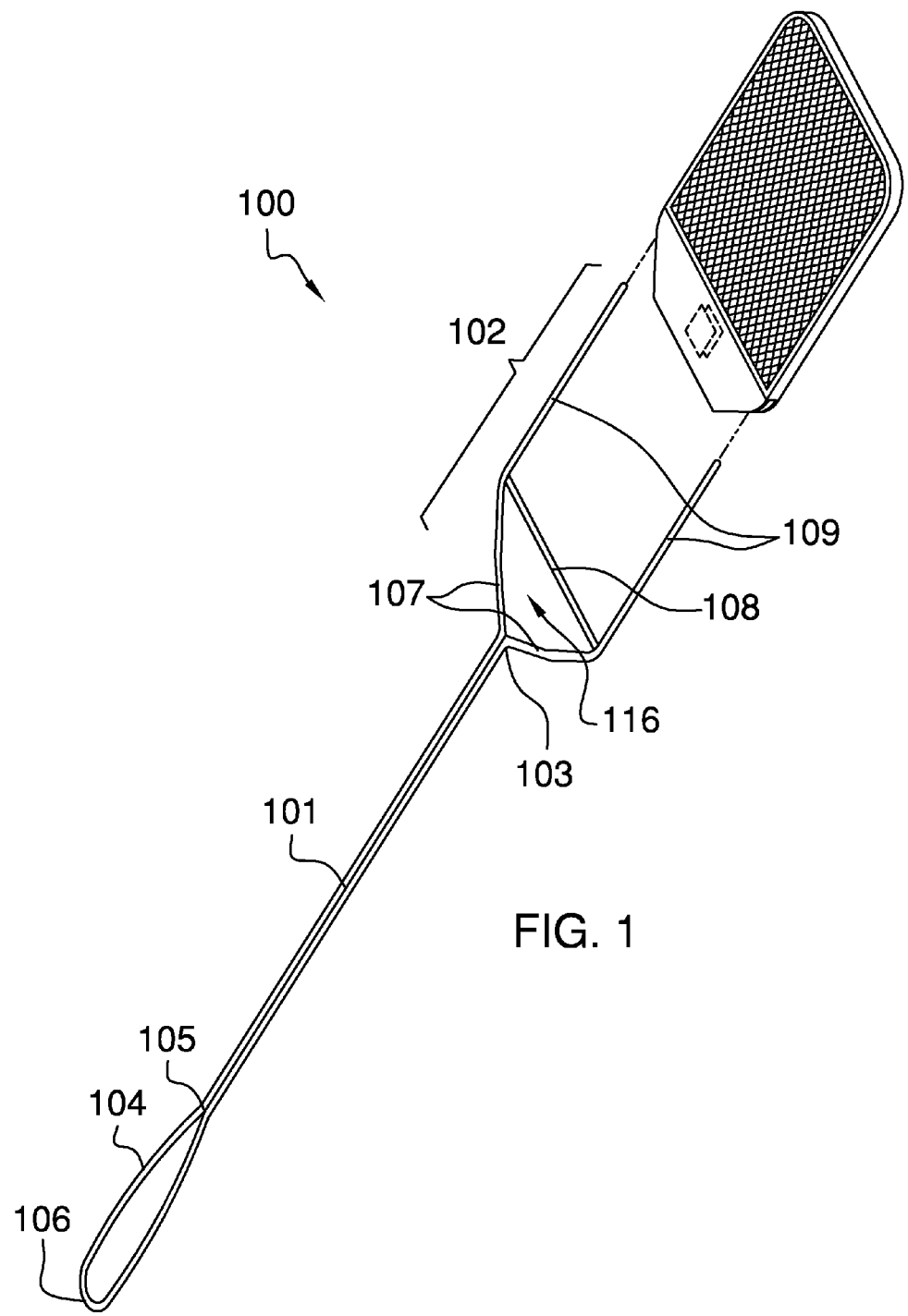
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to potential embodiments of the disclosure, which are illustrated in FIGS. 1 through 5. The fly swatter having a removable adhesive sleeve 100 (hereinafter invention) comprises a wire frame 101 that is further defined with a swatter frame 102 at a first distal end 103, and a handle 104 at a second distal end 105. The handle 104 is essentially an elongated loop that is formed into the wire frame 101, and extends to a third distal end 106.

The swatter frame 102 is further defined with a pair of diagonal members 107 that extend outwardly and connect to a lateral member 108. The lateral member 108 connects between the pair of diagonal members 107 and a pair of longitudinal members 109. The lateral member 108 and the pair of diagonal members 107 form a triangular opening 116. The pair of longitudinal members 109 is perpendicularly-oriented with respect to the lateral member 108.

The swatter frame 102 is designed to support a removable adhesive sleeve 110 thereon. Moreover, the removable adhesive sleeve 110 is able to slide onto and slide off of the wire frame 102. The removable adhesive sleeve 110 is further defined with a pair of flap members 111. The pair of flap members 111 is further defined with a first flap member 112 and a second flap member 113. The first flap member 112 is parallel to and adjacent the second flap member 113. The first flap member 112 is identical in size and shape with the second flap member 113.

The first flap member 112 and the second flap member 113 are further defined with an inner flap surface 114. The inner flap surface 114 includes a securing member 115 that is used to secure the first flap member 112 to the second flap member 113. The securing member 115 of the first flap member 112 secures to the securing member 115 of the second flap member 113. The securing member 115 of the first flap member 112 and the second flap member 113 comprises the use of adhesive, nylon hook or loop strips, or button snaps. Moreover, the securing member 115 of the first flap member 112 and the second flap member 113 secure to one another in between the lateral member 108 and the pair of diagonal members 107.

The removable adhesive sleeve 110 is also further defined with a mesh substrate 117 that includes an adhesive surface 118. The mesh substrate 117 and the adhesive surface 118 are provided on a first side 119 and a second side 120 of the removable adhesive sleeve 110. The first side 119 and the second side 120 are mirrors of one another, and are generally parallel with one another. The mesh substrate 117 is essentially a screen or a planar surface with a plurality of holes thereon so as to enable air movement across the first side 119 to the second side 120, and vice versa.

The adhesive surface 118 is distal of the swatter frame 102. The removable adhesive sleeve 110 is further defined with an opening 121 adjacent the pair of flap members 111 into which the swatter frame 102 is inserted and removed. The adhesive surface 118 is adapted to adhere a bug 200 to the removable adhesive sleeve 110 when in use. After use, the bug 200 and the removable adhesive sleeve 110 are removed from the swatter frame 102, and discarded. The removable adhesive sleeve 110 is intended to be a disposable component of the invention 100.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A fly swatter having a removable adhesive sleeve comprising:
   a wire frame with a swatter frame integrated therein;
   wherein a removable adhesive sleeve is selectively positioned onto the swatter frame;
   wherein the removable adhesive sleeve is adapted to swat at and adhere a bug thereon;
   wherein the swatter frame is provided at a first distal end of the wire frame;
   wherein the wire frame is further defined with a handle that is provided at a second distal end;
   wherein the handle is further defined as an elongated loop that is formed into the wire frame, and extends to a third distal end;
   wherein the swatter frame is further defined with a pair of diagonal members that extends outwardly and connect to a lateral member;
   wherein the lateral member connects between the pair of diagonal members and a pair of longitudinal members;
   wherein the lateral member and the pair of diagonal members form a triangular opening;
   wherein the pair of longitudinal members is perpendicularly-oriented with respect to the lateral member;
   wherein the swatter frame is designed to support the removable adhesive sleeve thereon;
   wherein the removable adhesive sleeve is able to slide onto and slide off of the wire frame;
   wherein the removable adhesive sleeve is further defined with a pair of flap members.

2. The fly swatter having a removable adhesive sleeve according to claim 1 wherein the pair of flap members is further defined with a first flap member and a second flap member.

3. The fly swatter having a removable adhesive sleeve according to claim 2 wherein the first flap member is parallel to and adjacent the second flap member; wherein the first flap member is identical in size and shape with the second flap member.

4. The fly swatter having a removable adhesive sleeve according to claim 3 wherein the first flap member and the second flap member are further defined with an inner flap surface.

5. The fly swatter having a removable adhesive sleeve according to claim 4 wherein the inner flap surface includes a securing member that is used to secure the first flap member to the second flap member.

6. The fly swatter having a removable adhesive sleeve according to claim 5 wherein the securing member of the first flap member secures to the securing member of the second flap member within the triangular opening of the swatter frame.

7. The fly swatter having a removable adhesive sleeve according to claim 6 wherein the removable adhesive sleeve is also further defined with a mesh substrate that includes an adhesive surface.

8. The fly swatter having a removable adhesive sleeve according to claim 7 wherein the mesh substrate and the adhesive surface are provided on a first side and a second side of the removable adhesive sleeve.

9. The fly swatter having a removable adhesive sleeve according to claim 8 wherein the first side and the second side are mirrors of one another, and are generally parallel with one another; wherein the mesh substrate enables air movement across the first side to the second side, and vice versa.

10. The fly swatter having a removable adhesive sleeve according to claim 9 wherein the adhesive surface is distal of the swatter frame.

11. The fly swatter having a removable adhesive sleeve according to claim 10 wherein the removable adhesive sleeve is further defined with an opening adjacent the pair of flap members into which the swatter frame is inserted and removed.

\* \* \* \* \*